Sept. 9, 1958     A. O. FABRIN     2,850,982

SHAFT COUPLING MEANS

Filed July 23, 1956

INVENTOR,
AXEL O. FABRIN

United States Patent Office 2,850,982
Patented Sept. 9, 1958

2,850,982

SHAFT COUPLING MEANS

Axel O. Fabrin, Memphis, Tenn., assignor to Layne & Bowler, Inc., Memphis, Tenn., a corporation of Delaware Application July 23, 1956, Serial No. 599,447

7 Claims. (Cl. 103—87)

This invention relates to a coupling for shafts which is particularly adapted for use in coupling the motor drive shaft to the line shaft in certain well pumping systems.

The conventional well pumping system with which the shaft coupling of the present invention is particularly adapted for use comprises in general a drive motor mounted on a discharge casting above ground level with a pipe coupled at its upper end to the discharge casting and depending downwardly into the well. Said discharge casting includes an elbow passageway which is in communication with the upper end of said pipe and which together with the pipe acts as a conduit for the well water or other liquid. Pump means are disposed in the well adjacent the lower end of said pipe and are driven by said motor which is coupled thereto by a shaft which extends downwardly from the motor through an aperture in the discharge casting, through the elbow passageway and through the pipe to the pumps. Where said shaft extends through said discharge casting aperture a stuffing box is provided to prevent leakage of the water from the elbow passageway. Said shaft is normally provided with a break adjacent the upper end of the well which divides the shaft into a drive shaft and a line shaft, the drive shaft being the relatively short section of shaft which serves as the main shaft for the motor and extends therefrom, and the line shaft being the longer section or sections of shaft extending from the drive shaft to the pumps. It is desirable to extend the drive shaft below the stuffing box so that the coupling between the drive shaft and line shaft is disposed at a point below the stuffing box adjacent the upper end of said pipe. It is desirable to so locate the coupling instead of locating it above the stuffing box for a number of reasons, among them being the following: The discharge casting may be of decreased height as opposed to the increased height thereof otherwise necessary to accommodate the coupling above the stuffing box; and there is practically no whipping of the shaft in the stuffing box when the coupling is located a considerable distance below the stuffing box, whereas when the coupling is above the stuffing box the necessary manufacturing variations in the threads of the coupling cause the line shaft to be eccentric with respect to the drive shaft which causes a whipping of the stuffing box by the line shaft.

Heretofore conventional internally threaded cylindrical pipe couplings have been used to couple together the externally threaded ends of the drive shaft and line shaft. It is obvious that heretofore the location of the coupling below the stuffing box caused inconvenience in installation and service, particularly when it became necessary to remove the motor and drive shaft for any reason, as when the motor burned out and needed replacing, whereupon it was necessary to remove the discharge casting to gain access to the coupling. This removal of the casting proved time-consuming and costly.

It is contemplated in the present invention to provide a shaft coupling in which the point of joining is below the stuffing box to gain the advantages of such a location and yet to provide a shaft coupling which overcomes the above mentioned objections. In the present invention such objections are overcome by providing an improved coupling in the form of a hollow elongated sleeve having internal threading adjacent the lower end thereof, whereby the internal threading may join the externally threaded ends of the drive shaft and line shaft at a point below the stuffing box with the upper end of the elongated sleeve extending upwardly between the stuffing box and the drive shaft, thus providing access to the coupling without having to remove the discharge casting. Additionally the present coupling is advantageous in that the previous wear on the drive shaft is eliminated since the drive shaft does not come in contact with the stuffing box, but instead the sleeve comes in contact therewith which may be replaced when neecssary.

It is not intended that the present invention be limited to the coupling of the drive shaft and line shaft in a pumping system herein described, but the present coupling is useful in applications where it is desirable to couple together two shafts from a point removed from the juncture thereof.

The principal object of the present invention is to provide an elongated coupling adapted for coupling together the ends of two shafts.

A further object of the invention is to provide such a coupling comprising an elongated cylindrical sleeve having internal threading adjacent one end thereof whereby the internal threading may join the externally threaded ends of two shafts at a juncture adjacent said one end with the sleeve extending away from the juncture to a point remote therefrom, thereby providing access to the coupling from said remote point.

A further object is to provide improved coupling means for coupling the motor drive shaft and line shaft substantially below the stuffing box in certain well pumping systems.

A further object is to provide such improved coupling means whereby access is provided to the coupling from a point outside of the discharge casting of the well pumping system whereby eliminating the necessity of removing the casting to uncouple and couple the coupling means.

A further object is to provide in such improved coupling means a sleeve extending from the juncture of the motor drive shaft and line shaft between the motor drive shaft and stuffing box whereby said sleeve turns in the stuffing box during drive of the shafts and isolates the drive shaft from the stuffing box so that any "whip" in the shaft is dissipated in the spacing between the coupling sleeve and the drive shaft, substantially preventing damage to the stuffing box.

A further object of the invention is to generally improve the design and construction of shaft couplings.

The means by which the foregoing and other objects of the present invention are accomplished and the manner of their accomplishment will be readily understood from the following specification upon reference to the accompanying drawings, in which.

Figure 1:
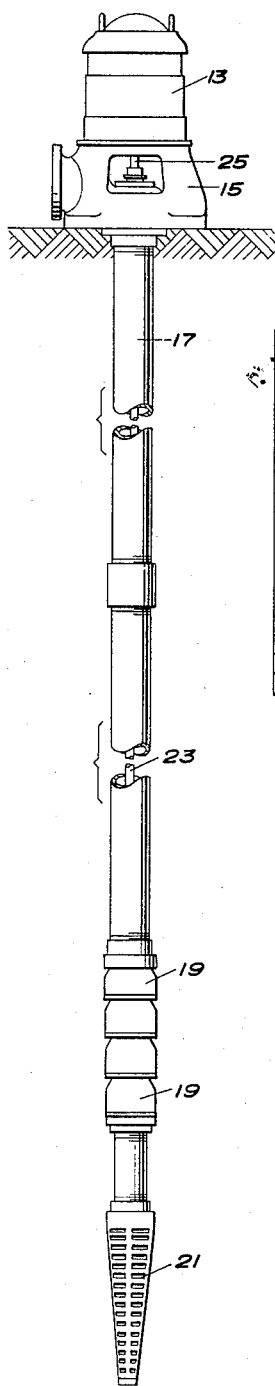
Fig. 1 illustrates a well pumping system in which the device of the present invention may be used.
Figure 2:
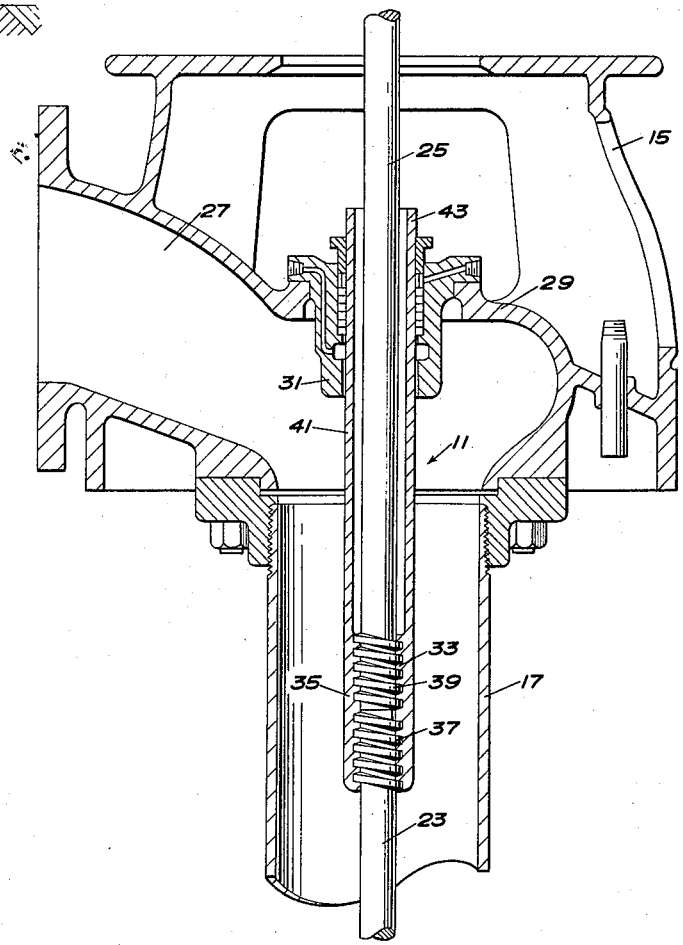
Fig. 2 is a fragmentary vertical cross sectional view on an enlarged scale of a portion of the system illustrated in Fig. 1.

Referring now to the drawings in which the various parts are indicated by numerals, the shaft coupling of the present invention, generally designated as at 11, is particularly adapted to be used in a well pumping system, as illustrated in Fig. 1, wherein it will be seen the system comprises in general a drive motor 13 mounted on a discharge casting 15 having a depending pipe 17 coupled thereto. Discharge casting 15 is adapted to be disposed above the surface of the ground with pipe 17 depending into the well. Suitable pump means 19 may be provided at the lower end of depending pipe 17, and coupled below the pump is a strainer 21. Extending centrally and longitudinally of depending pipe 17 is a rotatably supported line shaft 23 which is coupled at its lower end to pumps 19 and at its upper end to the drive shaft 25 of motor 13 whereby means is provided for driving pump 19. Thus in this well-known pumping system which for the sake of simplicity is herein only generally described, the water or other liquid is adapted to be pumped from the lower end of the well through strainer 21 through the interior of pipe 17 and out through an elbow passageway 27, which is formed in discharge casting 15. One end of elbow passageway 27 is in communication with the upper end of depending pipe 17, and together with the pipe acts as a conduit for the water.

In pumping systems of the type herein described, bearing means of the stuffing box type is generally employed where the motor drive shaft 25 extends through an aperture in the wall 29 of elbow passageway 27 whereby means is provided for sealing the exterior of the drive shaft to prevent water or other liquid from passing out between the wall 29 and the drive shaft. In the present drawings said bearing means is a stuffing box of conventional construction and is designated herein as 31.

It is desirable to couple the lower end of motor drive shaft 25 and the upper end of line shaft 23 at a point below the stuffing box 31 as hereinabove explained. Heretofore this coupling has been by means of conventional internally threaded cylindrical pipe couplings and it has heretofore been necessary in order to uncouple said conventional coupling to remove the entire discharge casting 15 from depending pipe 17 to gain access to said conventional coupling. Also heretofore, the motor drive shaft 25 has been journalled directly in stuffing box 31.

It is contemplated in the present invention to provide improved coupling means for coupling the motor drive shaft 25 and line shaft 23 whereby it will not be necessary to remove the discharge casting 15 to uncouple the line shaft and motor drive shaft. The improved coupling 11 of the present invention is in the form of a hollow cylindrical elongated sleeve having internal threading 33 adjacent the lower end 35 thereof. The internally threaded lower end 35 is of a diameter to mate with and threadedly engage the externally threaded upper end 37 of line shaft 23 and the threaded lower end 39 of motor drive shaft 25. The upper sleeve portion 41 of coupling 11 extends upwardly away from lower end 35 and rotatably extends through stuffing box 31 to project above the packing as at 43. The internal diameter of the upper sleeve portion 41 is preferably greater than the internal diameter of lower end 35, so as to provide spacing between shaft 25 and coupling portion 41.

Motor drive shaft 25 extends downwardly into coupling 11 with the threaded lower end 39 being threadedly joined to internal threading 33 whereby the line shaft 23 and motor drive shaft 25 are coupled together at a juncture below stuffing box 31.

In the operation of the device employing the present invention, the motor through drive shaft 25 is effective to drive line shaft 23, coupled to shaft 25 by coupling 11. Coupling 11 is also rotated under such drive and turns in the stuffing box. Any eccentricity in the shafts due to the manufacturing tolerances in the threads is by the elongated coupling sleeve spaced substantially below the stuffing box and the drive shaft is isolated from the stuffing box by the sleeve so that any "whip" in the shaft is dissipated in the spacing between the coupling sleeve and the drive shaft, substantially preventing damage to the stuffing box or other bearing.

From the foregoing it will be apparent that means is provided for uncoupling the main shaft 23 and motor drive shaft 25 without removal of discharge casting 15. Thus for example, if it is desired to replace drive motor 13 a wrench or the like may be clamped on portion 43 to hold coupling 11 in place and motor drive shaft 25 unthreaded from internal threading 33 so that the motor drive shaft 25 with the motor 13 may be withdrawn to be replaced by a new motor using the reverse of the above outlined procedure.

It is not intended to so limit the present invention to application with well pumping systems, but the present device may be employed where it is desirable to couple together the externally threaded ends of two shafts on one side of a bearing means and to provide access thereto from the other side of said bearing means. Additionally, the present coupling may be employed in applications where it is desired to couple together two shafts from a point removed from the juncture of the shafts.

I claim:

1. For use in a well pumping system of the type including a discharge casting formed with an elbow passageway therein, a stuffing box mounted in said discharge casting, a depending pipe coupled to said discharge casting and in communication with said elbow passageway for acting as a conduit for the flow of liquid from the lower end thereof through the pipe and elbow passageway, a line shaft centrally supported in said depending pipe, said line shaft terminating below said casting and said stuffing box and including an externally threaded upper end, and a motor drive shaft extending from the exterior of said discharge casting through and below said stuffing box and said passageway into said depending pipe, said motor drive shaft including an externally threaded lower end spaced below said stuffing box; coupling means for coupling said motor drive shaft with said line shaft comprising a hollow cylindrical elongated sleeve extending through and below said stuffing box and casting into said pipe with its lower end in said pipe, said sleeve having a minor length section of internal threading adjacent the lower end of said sleeve threadedly engaging said externally threaded upper end of said line shaft remote from said stuffing box and said casting, said sleeve rotatably engaging and projecting above said stuffing box whereby access is provided to said sleeve on the exterior of said casting, said motor drive shaft removably extending downwardly within said sleeve throughout the majority of the length of said sleeve with the lower end of said motor drive shaft being threadedly joined to said internal threading in said sleeve below and remote from said stuffing box and casting, whereby said drive shaft is removable from said coupling sleeve without removal of said discharge casting.

2. For use in a well pumping system of the type including a discharge casting formed with an elbow passageway therein, a stuffing box mounted in said discharge casting, a depending pipe coupled to said discharge casting and in communication with said elbow passageway for acting as a conduit for the flow of liquid from the lower end thereof through the pipe and elbow passageway, a line shaft centrally supported in said depending pipe, said line shaft terminating below said casting and said stuffing box and including a threaded upper end, and a motor drive shaft extending from the exterior of said discharge casting through and below said stuffing box and said passageway into said depending pipe, said motor drive shaft including a threaded lower end spaced below said stuffing box; coupling means for coupling said motor drive shaft with said line shaft comprising a hollow elongated sleeve extending through and below said stuffing box and casting into said pipe with its lower end in said pipe, said sleeve having a minor length of threading adjacent the lower end of said sleeve threadedly engaging said threaded upper end of said line shaft remote from said stuffing box and said casting, said sleeve rotatably engaging and projecting above said stuffing box whereby access is provided to said sleeve on the exterior of said casting, said motor drive shaft removably extending downwardly within said sleeve throughout the majority of the length of said sleeve with the lower end of said motor drive shaft being threadedly joined to said threading in said sleeve below and remote from said stuffing box and casting, whereby said drive shaft is removable from said coupling sleeve without removal of said discharge casting.

3. Coupling means adapted to couple together the externally threaded ends of two shafts on one side of and spaced from a bearing means and adapted to provide access thereto from the other side of said bearing means, comprising a hollow cylindrical elongated coupling sleeve having internal threading adjacent one end thereof threadedly engaging the external threading of one of said shafts on said one side spaced from said bearing means, said sleeve extending away from said engagement and rotatably supported in and through said bearing means, the other of said shafts removably extending into said sleeve with the threaded end thereof being threadedly joined to said internal threading in said sleeve spaced from said bearing means beyond said one side, whereby said other of said shafts is adapted to be removed from said coupling sleeve from said other side of said bearing means.

4. Coupling means adapted to couple together the threaded ends of two shafts on one side of and spaced from a bearing means and adapted to provide access thereto from the other side of said bearing means, comprising a hollow elongated coupling sleeve having threading adjacent one end thereof threadedly engaging at said one end the threading of one of said shafts on said one side spaced from said bearing means, said sleeve extending away from said engagement and rotatably supported in and through said bearing means, the other of said shafts removably extending from the other end of said sleeve into said sleeve with the threaded end of said other shaft being threadedly joined to said threading in said sleeve spaced from said bearing means beyond said one side, said other shaft being radially spaced inwardly from said sleeve throughout the length of said sleeve from said other sleeve end to said threading, whereby said other of said shafts is adapted to be removed from said coupling sleeve from said other side of said bearing means.

5. In a pumping system which includes a discharge casing, journal means in said casing, a depending pipe coupled to and depending below said casing in fluid flow communication with said casing, pump means at the lower end of said pipe, a line shaft coupled to said pump means and extending upwardly through said pipe, a motor above said casing, a motor shaft coupled to said motor and extending downwardly through and below said casing journal means into said pipe and into adjacency with the upper end of said line shaft, an elongated hollow sleeve journalled in said casing journal means and extending below said casing and said journal means into said pipe, said sleeve at its lower end and below said casing and said journal means surrounding the lower portion of said drive shaft and the upper end of said line shaft, said sleeve including a coupling section at its lower end engaging said line shaft adjacent the upper end of said line shaft and said drive shaft adjacent the lower end of said drive shaft and intercoupling said shafts remote from and below said casing and said journal means for conjoint drive by said motor, said sleeve above said coupling section and upwardly through said casing journal means being radially spaced from said drive shaft to isolate said drive shaft from said journal means and to dissipate eccentric whip of said drive shaft under motor driven rotation in said radial spacing, whereby to prevent damage to said journal means by said drive shaft.

6. In a system which includes a casing, journal means in said casing, a depending pipe coupled to and depending below said casing in fluid flow communication with said casing, a line shaft extending through said pipe, a motor above said casing, a motor shaft coupled to said motor and extending downwardly through said casing journal means into said pipe and into adjacency with the upper end of said line shaft, an elongated hollow sleeve journalled in said casing journal means and extending below said casing into said pipe, said sleeve surrounding the lower portion of said drive shaft and the upper end of said line shaft, said sleeve including a coupling section engaging said line shaft adjacent the upper end of said line shaft and said drive shaft adjacent the lower end of said drive shaft and intercoupling said shafts remote from and below said casing for conjoint drive by said motor, said sleeve above said coupling section and upwardly through said casing journal means being radially spaced from said drive shaft to isolate said drive shaft from said journal means and to dissipate eccentric whip of said drive shaft under motor driven rotation in said radial spacing, whereby to prevent damage to said journal means by said drive shaft.

7. In a system which includes a casing, a stuffing box in said casing, a depending pipe coupled to and depending below said casing in flow communication with said casing, a line shaft extending through said pipe, a motor above said casing, a motor shaft coupled to said motor and extending downwardly through said stuffing box into said pipe and into adjacency with the upper end of said line shaft, an elongated hollow sleeve journalled in said stuffing box and extending below said casing and said stuffing box into said pipe, said sleeve surrounding the lower portion of said drive shaft and the upper end of said line shaft remote from said stuffing box, said sleeve including a coupling section engaging said line shaft adjacent the upper end of said line shaft and said drive shaft adjacent the lower end of said drive shaft and intercoupling said shafts remote from said casing and said stuffing box for conjoint drive by said motor, said sleeve above said coupling section and upwardly through said stuffing box being radially spaced from said drive shaft to isolate said drive shaft from said stuffing box and to dissipate eccentric whip of said drive shaft under motor driven rotation in said radial spacing, whereby to prevent damage to said stuffing box by said drive shaft.

References Cited in the file of this patent

UNITED STATES PATENTS 1,739,803     Schlegel et al. _____ Dec. 17, 1929